(12) United States Patent
Liu et al.

(10) Patent No.: US 11,440,628 B2
(45) Date of Patent: Sep. 13, 2022

(54) FLOATING HYDROPHYTE PLANTING DEVICE

(71) Applicant: Fishery Machinery and Instrument Research Institute, Chinese Academy of Fishery Sciences, Shanghai (CN)

(72) Inventors: Xingguo Liu, Shanghai (CN); Xiaolong Chen, Shanghai (CN); Hao Zhu, Shanghai (CN); Zixin Gao, Shanghai (CN); Keju Li, Shanghai (CN)

(73) Assignee: FISHERY MACHINERY AND INSTRUMENT RESEARCH INSTITUTE, CHINESE ACADEMY OF FISHERY SCIENCES, Shanghai (CN)

( * ) Notice: Subject to any disclaimer, the term of this patent is extended or adjusted under 35 U.S.C. 154(b) by 359 days.

(21) Appl. No.: 16/884,091

(22) Filed: May 27, 2020

(65) Prior Publication Data
US 2021/0047010 A1 Feb. 18, 2021

(30) Foreign Application Priority Data
Aug. 15, 2019 (CN) .......................... 201910753667.1

(51) Int. Cl.
| | |
|---|---|
| *A01G 33/00* | (2006.01) |
| *B63B 35/44* | (2006.01) |
| *E02F 9/06* | (2006.01) |
| *C02F 3/32* | (2006.01) |

(52) U.S. Cl.
CPC .............. *B63B 35/44* (2013.01); *A01G 33/00* (2013.01); *E02F 9/06* (2013.01); *B63B 2035/4493* (2013.01); *C02F 3/32* (2013.01)

(58) Field of Classification Search
CPC .......... A01G 33/00; A01G 31/00; A01G 9/12; A01G 9/128; A01G 17/06; A01G 2017/065; B63B 2035/4493; B63B 35/44
See application file for complete search history.

(56) References Cited

U.S. PATENT DOCUMENTS

| | | | |
|---|---|---|---|
| 2004/0026678 A1* | 2/2004 | Vandergrift | ............. E04H 17/10 256/47 |
| 2009/0126265 A1* | 5/2009 | Rasmussen | ............ C12M 41/34 47/1.4 |

* cited by examiner

*Primary Examiner* — Kristen C Hayes
(74) *Attorney, Agent, or Firm* — Amster, Rothstein & Ebenstein LLP

(57) ABSTRACT

The present invention relates to a floating hydrophyte planting device, comprising a height-adjustable support, a buoyant rope, a planting net rope, a stabilizing rope and hydrophytes. The height-adjustable support comprises a fixed part and a movable part. The fixed part comprises columns and inclined stayed and fixed steel wires. A sawtooth groove is arranged on one side face of the column in the height direction and has multiple notches at different heights. The movable part comprises a twisting pull rod. The twisting pull rod is provided with a cross locking column vertical to the body of the twisting pull rod. The locking column is limited in the notch. After the twisting pull rod is twisted, the cross locking column may separate from the notch; after the twisting pull rod moves in the vertical direction and is twisted again, the cross locking column is limited in another notch.

8 Claims, 2 Drawing Sheets

FLOATING HYDROPHYTE PLANTING DEVICE

TECHNICAL FIELD

The present invention relates to a floating hydrophyte planting device, and belongs to the field of hydrophyte planting technologies.

BACKGROUND

There are a lot of deep water areas, such as the lake, the reservoir, the river and the like in China. However, due to environment pollution, the environment of the water area is deteriorating day by day. So, ecological restoration of the water area is the important content of the environment protection in China. Currently, the ecological restoration of the water area such as the lake, the reservoir, the river and the like in China mainly utilizes methods of pollution source control, dredging, aeration, sedimentation, hydrophyte plant, microorganism release, hydrophyte placement, biological chain adjustment and control, etc. The most commonly used technical method to repair the polluted water body is planting the hydrophytes. The method of using the hydrophytes to repair the environment of the water area has the characteristics of wide application range, quick effect, good landscape effect and the like, but also has the problems that the hydrophytes are hard to be planted and controlled in the deep water.

Especially, to a deeper ponds or lake and a water area with poor water quality, such as a large deep lake, the sun cannot irradiate the underwater layer, and the hydrophytes cannot obtain the illumination to grow up, resulting in worse water quality and lower transparency. However, the hydrophytes floating on the water surface are directly irradiated by the sun to cause too strong illumination and too high temperature, so, the hydrophytes cannot grow up while floating on the water surface.

In conclusion, the existing submerged hydrophyte planting method generally is suitable for small and shallow water areas. Additionally, the existing submerged hydrophyte planting device has high building costs, is hardly applied to the large water area such as the lake and the like. Furthermore, with the growth of the submerged hydrophyte such as aquatic weed, its buoyancy is also increased. Therefore, it is an emergent technical problem how to regulate the depth of the aquatic weeds in the large water area.

SUMMARY

The objective of the present invention is to propose a floating hydrophyte planting device. The floating hydrophyte planting device can control the height of the hydrophyte under the water and flexibly plant the hydrophyte, which is not influenced by the water level variation and the freezing phenomenon in winter and meets the requirements of purifying the water quality and increasing the plant diversity. The floating hydrophyte planting device is ecological, environmentally friendly, simple to construct, convenient to manage and the like. Additionally, such device can effectively adjust and control the diversity and the density of plants in the water body to improve the ecological environment of the water body. Furthermore, such device can be conveniently and effectively built and maintained at low costs. Therefore, the floating hydrophyte planting device is especially applicable to planting large-area aquatic plants in deep water of the large water area.

The present invention adopts the following technical solution:

A floating hydrophyte planting device comprises a height-adjustable support 1, a buoyant rope 2, a planting net rope 3, a stabilizing rope 4 and hydrophytes 5. The height-adjustable support 1 comprises a fixed part and a movable part. The fixed part comprises columns. Each column is fixed to the ground or the water bottom through a plurality of fixed steel wires 1-3. A sawtooth groove 1-5 is arranged on the column in the height direction and has multiple notches 1-8 at different heights. The movable part comprises a twisting pull rod 1-1. The twisting pull rod 1-1 is provided with a cross locking column 1-7 vertical to the body of the twisting pull rod. The locking column 1-7 is limited in the notch 1-8. After the twisting pull rod 1-1 is twisted, the cross locking column 1-7 may separate from the notch 1-8; after the twisting pull rod 1-1 moves in the vertical direction and is twisted again, the cross locking column 1-7 is limited in another notch 1-8. Two ends of the buoyant rope 2 are respectively fixedly connected with the twisting pull rods 1-1. Multiple foam floating balls 2-2 are fixedly arranged on the buoyant rope 2. Two ends of the planting net rope 3 are respectively movably connected with the twisting pull rods 1-1. Multiple hydrophytes 5 are fixedly arranged on the planting net rope 3. Two ends of the stabilizing rope 4 are respectively movably connected with the twisting pull rods 1-1. Multiple weights 4-3 are fixedly arranged on the stabilizing rope 4. Each foam floating ball 2-2 is connected with the planting net rope 3 through a tow rope 2-3. The planting net rope 3 is connected with the weights 4-3 through pulling ropes 4-2.

Preferably, the column is a steel tube 1-2. A tube sleeve 1-4 fixedly sleeves the steel tube 1-2. A plurality of retaining rings 1-6 are arranged on the surface of the tube sleeve 1-4. The fixed steel wire 1-3 is arranged in an incline manner. One end of the fixed steel wire is fixed to the retaining ring, and the other end is fixed to the bottom of a water body.

Preferably, the twisting pull rod 1-1 has a structure of a T-shaped solid steel rod. The upper end of the twisting pull rod is a T-shaped cross twisting pull rod. Corresponding to the sawtooth groove 1-5, the twisting pull rod is respectively provided with three through holes, namely an upper through hole, a middle through hole and a lower through hole. The three through holes are used for fixing the buoyant rope 2, the planting net rope 3 and the stabilizing rope 4.

Further, the length of the twisting pull rod 1-1 allows it to reach the lower end of the sawtooth groove 1-5. The cross locking column 1-7 is arranged at the tail end of the twisting pull rod 1-1 and can be inserted into the sawtooth groove 1-5. A control rod 1-1 can move up and down by pulling or pressing a cross rod of the twisting pull rod 1-1 to drive the fixed buoyant rope 2, the planting net rope 3 and the stabilizing rope 4 to move up and down. By twisting the cross rod, the cross locking column 1-7 can be locked in the notch 1-8 of the sawtooth groove 1-5. So, the twisting pull rod is fixed.

Further, the steel tube 1-2 is a galvanized steel tube in the range of Ø50-75 mm. One end of the steel tube is inserted into the bottom soil. The sawtooth groove 1-5 with the length of 1.5 m and the width from 2 cm to 3 cm is opened in the steel tube 1-2 under the water, and there are 3 to 5 notches 1-8. The fixed steel wire 1-3 is a steel wire of Ø2.5 mm. One end of the steel wire is fixed to the retaining ring 1-6 of the tube sleeve 1-4, and the other end is inserted into the bottom soil, wherein an angle formed by the steel wire and the steel tube is not less than 30 degrees. The buoyant rope 2 is a multiple-strand polyethylene rope 2-1 and is fixedly provided with Ø200 foam floating balls 2-2 at a space in the range of 0.3-0.5 m. The planting net rope 3 is formed by winding a polyethylene net with the mesh in the range of 1-2 cm and is tightly tied up by using straps at a space in the range of 30-40 cm. Two ends of the planting net rope 3-1 are respectively fixed to the interiors of the middle through holes of the two twisting pull rods 1-1. The length of the planting net rope 3-1 is 50 m. The stabilizing rope 4 is a multiple-strand polyethylene rope 4-1 and is provided with a pulling rope 4-2 at a space in the range of 0.3-0.5 m. The stabilizing rope is connected with the planting net rope 3-1 through the pulling ropes. The stabilizing rope is also provided with weights 4-3 at spaces, and the weight of each weight 4-3 is equal to the buoyancy of each floating ball. Two ends of the stabilizing rope 4 are respectively fixed to the lowest ends of the twisting pull rods 1-1.

Preferably, the hydrophyte 5 is the submerged and fibrous-root plant or the floating-leaved plant.

Further, the hydrophyte 5 is one or more elements selected from the group of *Potamogeton pectinatus*, *Hydrilla verticillata*, water caltrop and *Myriophyllum verticillatum*.

A mounting method of the floating hydrophyte planting device comprises the steps: arranging a certain amount of the height-adjustable supports 1 at an interval according to the area of a water body, wherein the total area of the floating hydrophyte planting devices is 10% to 20% of the total area of the water body; mounting two steel wires by the angle of 120 degrees on the opposite side of every two adjacent planting ropes 3 of the height-adjustable supports 1, wherein multiple height-adjustable supports 1 make the planting area have a net-shaped or sheet-shaped structure; when planting the hydrophyte 5, inserting the hydrophyte into the planting net rope according to the plant spacing from 0.3 m to 0.5 m, then placing the hydrophyte under the water; in use, according to the water surface variation and the size of the plant, twisting the twisting pull rod 1-1 and pulling it up and down to control the height of the hydrophyte under the water, thereby flexibly planting the hydrophyte.

The present invention has the following beneficial effects:

1), The floating hydrophyte planting device can control the height of the hydrophyte under the water and flexibly plant the hydrophyte, which is not influenced by the water level variation and the freezing phenomenon in winter and meets the requirements of purifying the water quality and increasing the plant diversity.

2), The floating hydrophyte planting device is ecological, environmentally friendly, simple to construct, convenient to manage and the like. Additionally, such device can effectively adjust and control the diversity and the density of plants in the water body to improve the ecological environment of the water body.

3), The floating hydrophyte planting device can be conveniently and effectively built and maintained at low costs. Therefore, the device is especially applicable to planting large-area aquatic plants in deep water of the large water area.

DESCRIPTION OF THE EMBODIMENTS

The following further describes the present invention with reference to the accompanying drawings and specific embodiments.

Figure 1:
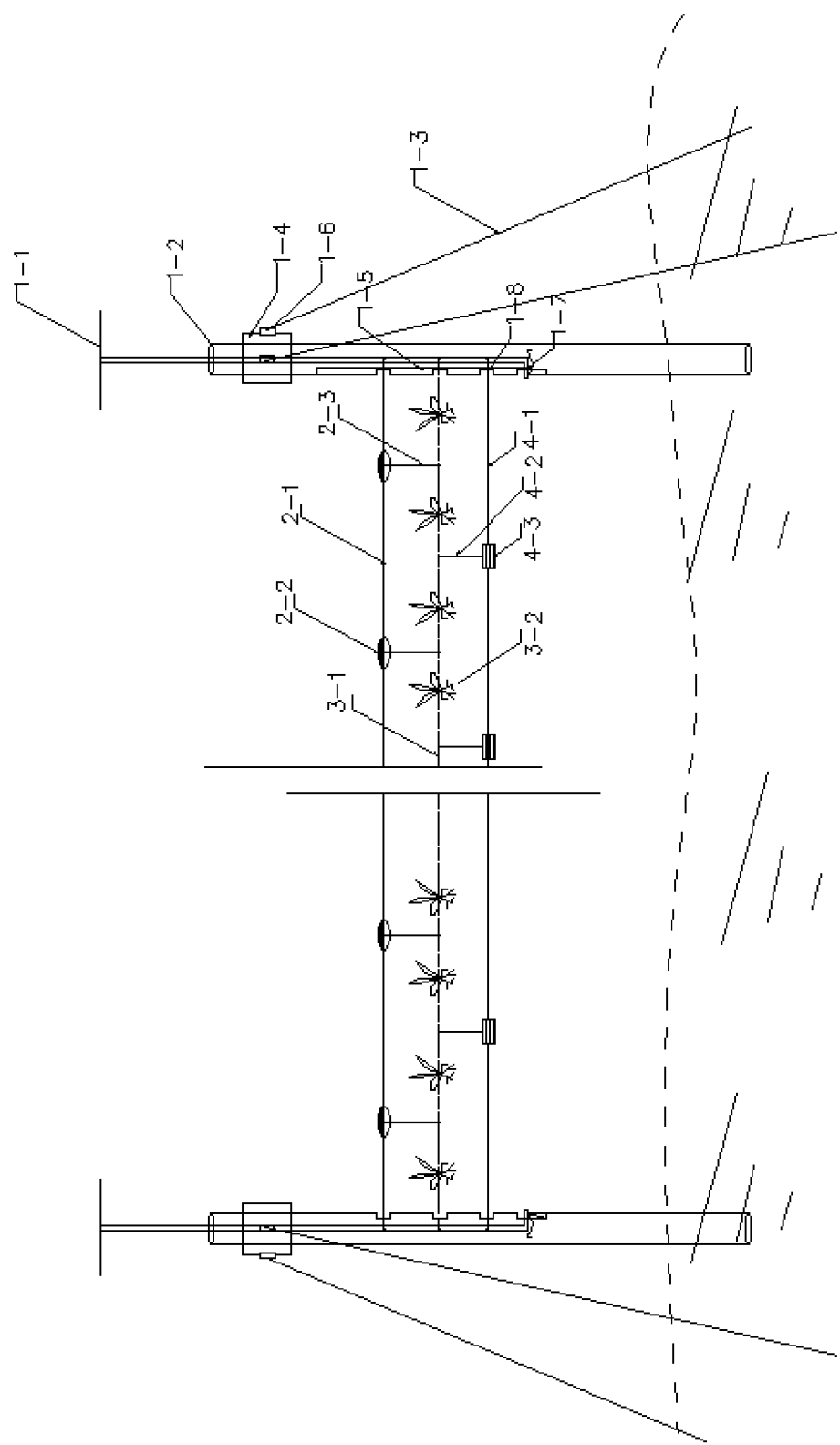
FIG. 1 is a vertical view of a floating planting device for hydrophytes in deep water of the present invention.
Figure 2:
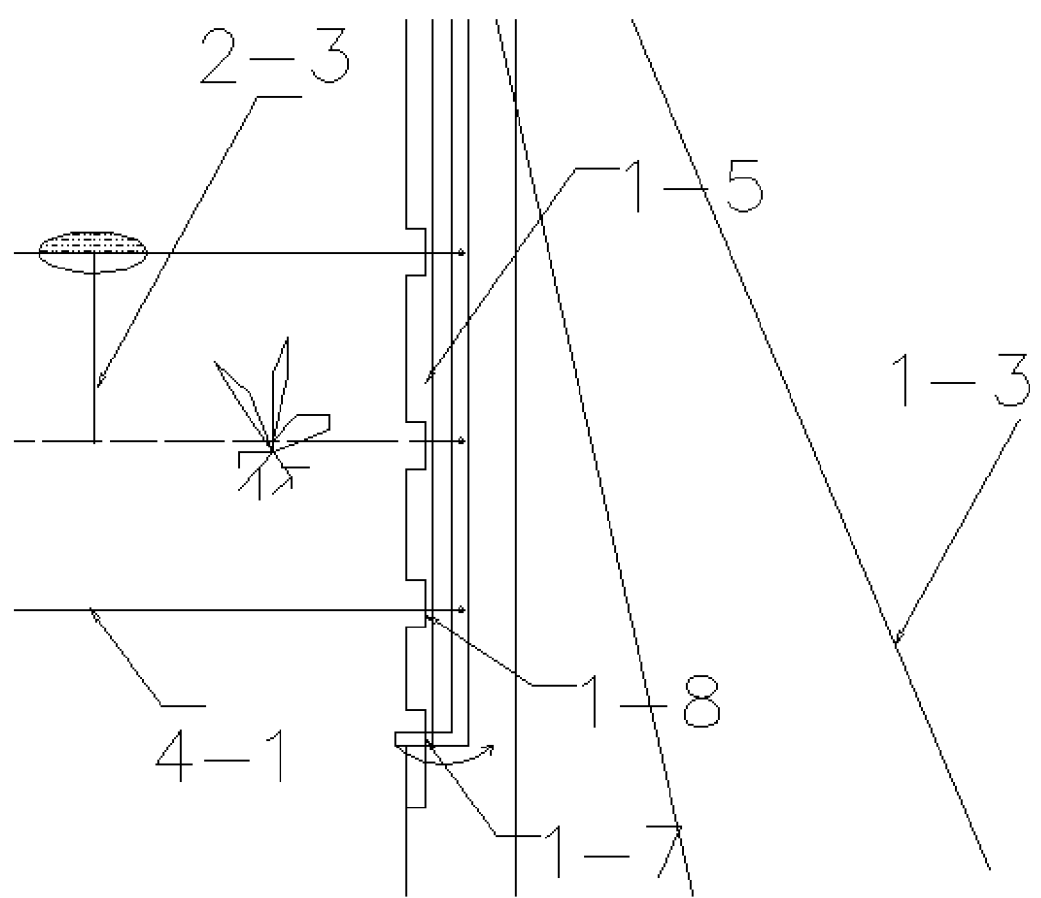
FIG. 2 is an enlarged partial diagram of FIG. 1.

Referring to FIG. 1 and FIG. 2, a floating hydrophyte planting device comprises a height-adjustable support 1, a buoyant rope 2, a planting net rope 3, a stabilizing rope 4 and hydrophytes 5. The height-adjustable support 1 comprises a fixed part and a movable part. The fixed part comprises columns. Each column is fixed to the ground or the water bottom through a plurality of fixed steel wires 1-3. A sawtooth groove 1-5 is arranged on the column in the height direction and has multiple notches 1-8 at different heights. The movable part comprises a twisting pull rod 1-1. The twisting pull rod 1-1 is provided with a cross locking column 1-7 vertical to the body of the twisting pull rod. The locking column 1-7 is limited in the notch 1-8. After the twisting pull rod 1-1 is twisted, the cross locking column 1-7 may separate from the notch 1-8; after the twisting pull rod 1-1 moves in the vertical direction and is twisted again, the cross locking column 1-7 is limited in another notch 1-8. Two ends of the buoyant rope 2 are respectively fixedly connected with the twisting pull rods 1-1. Multiple foam floating balls 2-2 are fixedly arranged on the buoyant rope 2. Two ends of the planting net rope 3 are respectively movably connected with the twisting pull rods 1-1. Multiple hydrophytes 5 are fixedly arranged on the planting net rope 3. Two ends of the stabilizing rope 4 are respectively movably connected with the twisting pull rods 1-1. Multiple weights 4-3 are fixedly arranged on the stabilizing rope 4. Each foam floating ball 2-2 is connected with the planting net rope 3 through a tow rope 2-3. The planting net rope 3 is connected with the weights 4-3 through pulling ropes 4-2.

In the embodiment, referring to FIG. 1, the column is a steel tube 1-2. A tube sleeve 1-4 fixedly sleeves the steel tube 1-2. A plurality of retaining rings 1-6 are arranged on the surface of the tube sleeve 1-4. The fixed steel wire 1-3 is arranged in an incline manner. One end of the fixed steel wire is fixed to the retaining ring, and the other end is fixed to the bottom of a water body.

In the embodiment, referring to FIG. 1, the twisting pull rod 1-1 has a structure of a T-shaped solid steel rod. The upper end of the twisting pull rod is a T-shaped cross twisting pull rod. Corresponding to the sawtooth groove 1-5, the twisting pull rod is respectively provided with three through holes, namely an upper through hole, a middle through hole and a lower through hole. The three through holes are used for fixing the buoyant rope 2, the planting net rope 3 and the stabilizing rope 4.

In the embodiment, referring to FIG. 1 and FIG. 2, the length of the twisting pull rod 1-1 allows it to reach the lower end of the sawtooth groove 1-5. The cross locking column 1-7 is arranged at the tail end of the twisting pull rod 1-1 and can be inserted into the sawtooth groove 1-5. A control rod 1-1 can move up and down by pulling or pressing a cross rod of the twisting pull rod 1-1 to drive the fixed buoyant rope 2, the planting net rope 3 and the stabilizing rope 4 to move up and down. By twisting the cross rod, the cross locking column 1-7 can be locked in the notch 1-8 of the sawtooth groove 1-5. So, the twisting pull rod is fixed.

In the embodiment, the steel tube 1-2 is a galvanized steel tube in the range of Ø50-75 mm. One end of the steel tube is inserted into the bottom soil. The sawtooth groove 1-5 with the length of 1.5 m and the width from 2 cm to 3 cm is opened in the steel tube 1-2 under the water, and there are 3 to 5 notches 1-8. The fixed steel wire 1-3 is a steel wire of Ø2.5 mm. One end of the steel wire is fixed to the retaining ring 1-6 of the tube sleeve 1-4, and the other end is inserted into the bottom soil, wherein an angle formed by the steel wire and the steel tube is not less than 30 degrees. The buoyant rope 2 is a multiple-strand polyethylene rope 2-1 and is fixedly provided with Ø200 foam floating balls 2-2 at a space in the range of 0.3-0.5 m. The planting net rope 3 is formed by winding a polyethylene net with the mesh in the range of 1-2 cm and is tightly tied up by using straps at a space in the range of 30-40 cm. Two ends of the planting net rope 3-1 are respectively fixed to the interiors of the middle through holes of the two twisting pull rods 1-1. The length of the planting net rope 3-1 is 50 m. The stabilizing rope 4 is a multiple-strand polyethylene rope 4-1 and is provided with a pulling rope 4-2 at a space in the range of 0.3-0.5 m. The stabilizing rope is connected with the planting net rope 3-1 through the pulling ropes. The stabilizing rope is also provided with weights 4-3 at spaces, and the weight of each weight 4-3 is equal to the buoyancy of each floating ball. Two ends of the stabilizing rope 4 are respectively fixed to the lowest ends of the twisting pull rods 1-1.

In the embodiment, the hydrophyte 5 is the submerged and fibrous-root plant or the floating-leaved plant.

In the embodiment, the hydrophyte 5 is one or more elements selected from the group of *Potamogeton pectinatus, Hydrilla verticillata*, water caltrop and *Myriophyllum verticillatum*.

During specific mounting, a certain amount of the height-adjustable supports 1 are arranged at an interval according to the area of a water body, wherein the total area of the floating hydrophyte planting devices is 10% to 20% of the total area of the water body. Two steel wires are mounted by the angle of 120 degrees on the opposite side of every two adjacent planting ropes 3 of the height-adjustable supports 1, wherein multiple height-adjustable supports 1 make the planting area have a net-shaped or sheet-shaped structure. When planting the hydrophyte 5, the hydrophyte is inserted into the planting net rope according to the plant spacing from 0.3 m to 0.5 m, then the hydrophyte is placed under the water. In use, according to the water surface variation and the size of the plant, the twisting pull rod 1-1 is twisted and then pulled up and down to control the height of the hydrophyte under the water, thereby flexibly planting the hydrophyte. A method is not influenced by the water level variation and the freezing phenomenon in winter and meets the requirements of purifying the water quality and increasing the plant diversity. The floating hydrophyte planting device is ecological, environmentally friendly, simple to construct, convenient to manage and the like. Additionally, such device can effectively adjust and control the diversity and the density of plants in the water body to improve the ecological environment of the water body.

What is claimed is:

1. A floating hydrophyte planting device,
   comprising a height-adjustable support (1), a buoyant rope (2), a planting net rope (3), a stabilizing rope (4) and hydrophytes (5), wherein
   the height-adjustable support (1) comprises a fixed part and a movable part; the fixed part comprises columns and stayed and fixed steel wires (1-3) fixed to the ground or the water bottom; a sawtooth groove (1-5) is arranged on the column in the height direction and has multiple notches (1-8) at different heights; the movable part comprises a twisting pull rod (1-1); the twisting pull rod (1-1) is provided with a cross locking column (1-7) vertical to the body of the twisting pull rod; the locking column (1-7) is limited in the notch (1-8); after the twisting pull rod (1-1) is twisted, the cross locking column (1-7) may separate from the notch (1-8); after the twisting pull rod (1-1) moves in the vertical direction and is twisted again, the cross locking column (1-7) is limited in another notch (1-8);
   two ends of the buoyant rope (2) are respectively fixedly connected with the twisting pull rods (1-1); multiple foam floating balls (2-2) are fixedly arranged on the buoyant rope (2);
   two ends of the planting net rope (3) are respectively movably connected with the twisting pull rods (1-1); multiple hydrophytes (5) are fixedly arranged on the planting net rope (3);
   two ends of the stabilizing rope (4) are respectively movably connected with the twisting pull rods (1-1); multiple weights (4-3) are fixedly arranged on the stabilizing rope (4);
   each foam floating ball (2-2) is connected with the planting net rope (3) through a tow rope (2-3); the planting net rope (3) is connected with the weights (4-3) through pulling ropes (4-2).

2. The floating hydrophyte planting device according to claim 1, wherein the column is a steel tube (1-2), a tube sleeve (1-4) fixedly sleeves the steel tube (1-2), and a plurality of retaining rings (1-6) are arranged on the surface of the tube sleeve (1-4); the fixed steel wire (1-3) is arranged in an incline manner; one end of the fixed steel wire is fixed to the retaining ring, and the other end is fixed to the bottom of a water body.

3. The floating hydrophyte planting device according to claim 2, wherein
   the steel tube (1-2) is a galvanized steel tube in the range of 050-75 mm; one end of the steel tube is inserted into the bottom soil; the sawtooth groove (1-5) with the length of 1.5 m and the width from 2 cm to 3 cm is opened in the steel tube (1-2) under the water, and there are 3 to 5 notches (1-8);
   the fixed steel wire (1-3) is a steel wire of 02.5 mm; one end of the steel wire is fixed to the retaining ring (1-6) of the tube sleeve (1-4), and the other end is inserted into the bottom soil, wherein an angle formed by the steel wire and the steel tube is not less than 30 degrees;
   the sawtooth groove (1-5) has the length from 1.0 m to 1.5 m and the width from 1.0 cm to 1.5 cm, and its top end is slightly higher than the water surface;
   the twisting pull rod (1-1) is a solid steel chisel of 01.0 cm;
   the buoyant rope (2) is a multiple-strand polyethylene rope (2-1) and is fixedly provided with Ø200 foam floating balls (2-2) at a space in the range of 0.3-0.5 m;
   the planting net rope (3) is formed by winding a polyethylene net with the mesh in the range of 1-2 cm and is tightly tied up by using straps at a space in the range of 30-40 cm; two ends of the planting net rope (3-1) are respectively fixed to the interiors of the middle through holes of the two twisting pull rods (1-1); the length of the planting net rope (3-1) is 50 m;
   the stabilizing rope (4) is a multiple-strand polyethylene rope (4-1) and is provided with a pulling rope (4-2) at a space in the range of 0.3-0.5 m; the stabilizing rope is connected with the planting net rope (3-1) through the pulling ropes; the stabilizing rope is also provided with weights (4-3) at spaces, and the weight of each weight (4-3) is equal to the buoyancy of each floating ball; two ends of the stabilizing rope (4) are respectively fixed to the lowest ends of the twisting pull rods (1-1).

4. The floating hydrophyte planting device according to claim 1, wherein the twisting pull rod (1-1) has a structure of a T-shaped solid steel rod; the upper end of the twisting pull rod is a T-shaped cross twisting pull rod; corresponding to the sawtooth groove (1-5), the twisting pull rod (1-1) is respectively provided with three through holes, namely an upper through hole, a middle through hole and a lower through hole; the three through holes are used for fixing the buoyant rope (2), the planting net rope (3) and the stabilizing rope (4).

5. The floating hydrophyte planting device according to claim 4, wherein the length of the twisting pull rod (1-1) allows it to reach the lower end of the sawtooth groove (1-5); the cross locking column (1-7) is arranged at the tail end of the twisting pull rod (1-1) and can be inserted into the sawtooth groove (1-5); a control rod (1-1) can move up and down by pulling or pressing a cross rod of the twisting pull rod (1-1) to drive the fixed buoyant rope (2), the planting net rope (3) and the stabilizing rope (4) to move up and down; by twisting the cross rod, the cross locking column (1-7) can be locked in the notch (1-8) of the sawtooth groove (1-5); so the twisting pull rod is fixed.

6. The floating hydrophyte planting device according to claim 1, wherein the hydrophyte (5) is the submerged and fibrous-root plant or the floating-leaved plant.

7. The floating hydrophyte planting device according to claim 6, wherein the hydrophyte (5) is one or more elements selected from the group of *Potamogeton pectinatus, Hydrilla verticillata*, water caltrop and *Myriophyllum verticillatum*.

8. A mounting method of the floating hydrophyte planting device according to claim 1, comprises the steps: arranging a certain amount of the height-adjustable supports (1) at an interval according to the area of a water body, wherein the total area of the floating hydrophyte planting devices is 10% to 20% of the total area of the water body; mounting two steel wires by the angle of 120 degrees on the opposite side of every two adjacent planting ropes (3) of the height-adjustable supports (1), wherein multiple height-adjustable supports (1) make the planting area have a net-shaped or sheet-shaped structure; when planting the hydrophyte (5), inserting the hydrophyte into the planting net rope according to the plant spacing from 0.3 m to 0.5 m, then placing the hydrophyte under the water; in use, according to the water surface variation and the size of the plant, twisting the twisting pull rod (1-1) and pulling it up and down to control the height of the hydrophyte under the water, thereby flexibly planting the hydrophyte.

\* \* \* \* \*